US009817370B2

(12) United States Patent
Amano

(10) Patent No.: US 9,817,370 B2
(45) Date of Patent: Nov. 14, 2017

(54) POINTER AND TIMEPIECE

(71) Applicant: CASIO COMPUTER CO., LTD., Shibuya-ku, Tokyo (JP)

(72) Inventor: Masao Amano, Uenohara (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/014,878

(22) Filed: Feb. 3, 2016

(65) Prior Publication Data
US 2016/0274541 A1   Sep. 22, 2016

(30) Foreign Application Priority Data
Mar. 17, 2015   (JP) ................. 2015-052843

(51) Int. Cl.
*G04B 19/04* (2006.01)
*G04B 19/12* (2006.01)
*G01D 13/22* (2006.01)

(52) U.S. Cl.
CPC ............. *G04B 19/12* (2013.01); *G01D 13/22* (2013.01); *G04B 19/042* (2013.01)

(58) Field of Classification Search
CPC ...... G04B 19/042; G04B 19/00; G04B 25/00; G04B 19/12; G04F 8/00; G01D 13/22
See application file for complete search history.

(56) References Cited

U.S. PATENT DOCUMENTS

| 5,168,006 A * | 12/1992 | Inoguchi | B29C 70/22 428/902 |
| 5,236,447 A * | 8/1993 | Kubo | A61F 2/06 623/1.13 |
| 7,173,883 B2 * | 2/2007 | Seyr | G04F 7/089 368/110 |
| 2005/0078561 A1 * | 4/2005 | Endo | B82Y 30/00 368/280 |
| 2011/0315303 A1 * | 12/2011 | Bird | B29C 70/22 156/94 |
| 2014/0064046 A1 | 3/2014 | Amano | |

FOREIGN PATENT DOCUMENTS

JP    5447900 B1    3/2014

OTHER PUBLICATIONS

Weave—dictionary.com Jan. 13, 2017.*
Textile—dictionary.com Jan. 13, 2017.*

* cited by examiner

*Primary Examiner* — Sean Kayes
(74) *Attorney, Agent, or Firm* — Holtz, Holtz & Volek PC

(57) ABSTRACT

A pointer including a pointer body formed using a carbon fiber textile sheet having a carbon fiber woven thereinto.

4 Claims, 7 Drawing Sheets

POINTER AND TIMEPIECE

CROSS-REFERENCE TO RELATED APPLICATION

This application is based upon and claims the benefit of priority from the prior Japanese Patent Application No. 2015-052843, filed Mar. 17, 2015, the entire contents of which are incorporated herein by reference.

BACKGROUND OF THE INVENTION

1. Field of the Invention

The present invention relates to a pointer which is used in timepieces such as wristwatches or measuring instruments such as meters, and a timepiece provided with the pointer.

2. Description of the Related Art

For example, a pointer of a wristwatch is known in which a plurality of fiber sheets having carbon fibers arranged in one direction are laminated with the arrangement directions of the carbon fibers being varied, whereby a material sheet is formed, and a pointer body is formed with this material sheet so that the weight of the pointer body is reduced, as described in Japanese Patent No. 5447900.

However, this pointer has a problem in that the rigidity is not sufficiently secured unless a plurality of fiber sheets having carbon fibers arranged in one direction are laminated, so that the entire thickness is large and the further reduction of the weight cannot be achieved.

The present invention relates to a pointer and a timepiece provided with the pointer where the thickness of the pointer body is formed thinner with its rigidity being secured so as to achieve the further reduction of the weight thereof.

SUMMARY OF THE INVENTION

In accordance with one aspect of the present invention, there is provided a pointer comprising: a pointer body formed using a carbon fiber textile sheet having a carbon fiber woven thereinto.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

First Embodiment

A first embodiment in which the present invention has been applied in a pointer of a wristwatch will hereinafter be described with reference to FIG. 1 to FIG. 4.

Figure 1:
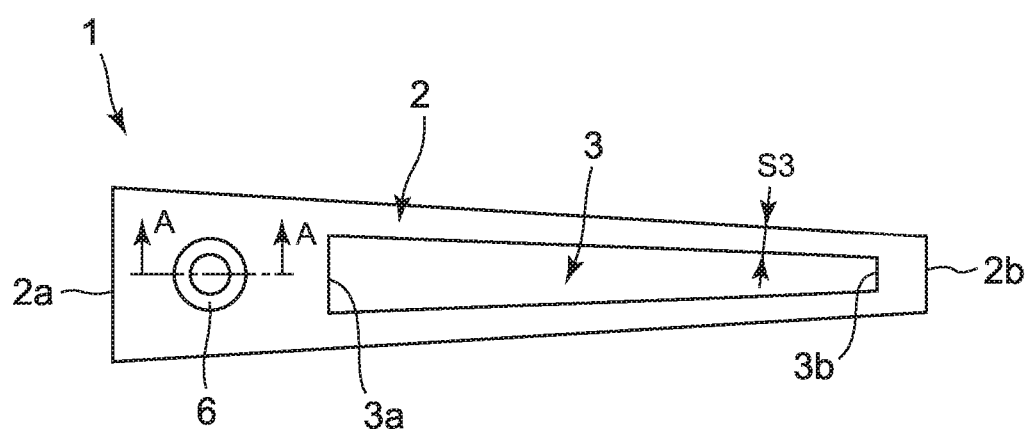
FIG. 1 is an enlarged front view depicting a first embodiment in which the present invention has been applied in a pointer of a wristwatch.
Figure 2:
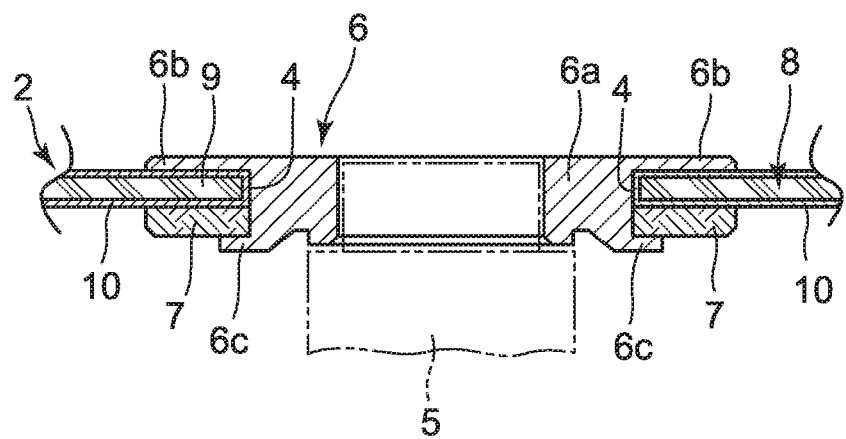
FIG. 2 is an enlarged sectional view of the main portion of the pointer taken along line A-A in FIG. 1.

As depicted in FIG. 1 and FIG. 2, the pointer 1 includes a pointer body 2. The pointer body 2 is formed in an elongated plate shape. More specifically, the pointer body 2 is formed in an elongated shape whose width is wide at one end 2a (in FIG. 1, the left end) and gradually becomes narrower toward the other end 2b side (in FIG. 1, the right end).

In the pointer body 2, a long hole 3 is provided in the longitudinal direction of the pointer body, as depicted in FIG. 1. This long hole 3 is formed in an elongated shape whose width is wide at one end 3a (in FIG. 1, the left side) and gradually becomes narrower toward the other end 3b side (in FIG. 1, the right side), as with the pointer body 2. In this embodiment, the pointer body 2 is formed such that one end 2a is positioned away from one end 3a of the long hole 3 and the length of an interval S3 between the outer circumference of the pointer body and the inner circumference of the long hole 3 is substantially the same in areas other than an area on one end 3a side of the long hole 3. In addition, on one end 2a side of the pointer body 2, a mount hole 4 is provided to be positioned between one end 2a of the pointer body 2 and one end 3a of the long hole 3.

Also, the pointer 1 is provided with a mount piece 6 referred to as "hakama" (in Japanese) for mounting the pointer body 2 on a pointer shaft 5, as depicted in FIG. 1 and FIG. 2. The mount piece 6 includes a cylindrical section 6a which is inserted into the mount hole 4 of the pointer body 2 to be fitted in the pointer shaft 5, a presser section 6b which is provided on the upper end of the cylindrical section 6a so as to press the upper surface of the pointer body 2, a washer section 7 which is inserted into the lower end of the cylindrical section 6a so as to be placed on the lower surface of the pointer body 2, and a swaged section 6c which is provided at the lower end of the cylindrical section 6a so as to press the washer section 7 against the lower surface of the pointer body 2.

In this embodiment the swaged section 6c is structured to push up the lower surface of the washer section 7 when swaged, as depicted in FIG. 2. Also, the swaged section 6c is structured to droop downward from the inside of the mount hole 4 of the pointer body 2 before swaging. As a result, the swaged section 6c is structured to pass through the mount hole 4 of the pointer body 2 and project to the lower side of the pointer body 2 when the cylindrical section 6a of the mount piece 6 is inserted from above into the mount hole 4 of the pointer body 2 in the mounting of the mount piece 6 onto the pointer body 2.

Also, when the swaged section 6c projects to the lower side of the pointer body 2 with the cylindrical section 6a of the mount piece 6 being inserted from above into the mount hole 4 of the pointer body 2 and the presser section 6b coming in contact with the upper surface of the pointer body 2, the washer section 7 is attached to the lower portion of the projecting cylindrical section 6a from below, and the swaging processing is performed in this state, whereby the swaged section 6c presses the washer section 7 against the lower surface of the pointer body 2, as depicted in FIG. 2.

As a result, the pointer 1 is structured as depicted in FIG. 2 such that, in a state where the cylindrical section 6a of the mount piece 6 has been inserted into the mount hole 4 of the pointer body 2 to cause the presser section 6b to come in contact with the upper surface of the pointer body 2, when swaging processing for the swaged section 6c is performed to cause the washer section 7 to push up the lower surface of the pointer body 2, the pointer body 2 is pinched between the washer section 7 and the presser section 6b in the thickness direction to mount the mount piece 6 on the pointer body 2.

Also, the pointer 1 is structured to be mounted at the upper end of the pointer shaft 5 by fitting the cylindrical section 6a of the mount piece 6 in the upper end of the pointer shaft 5 when the mount piece 6 is mounted on the pointer body 2, as depicted in FIG. 2. When the pointer shaft 5 is rotated by a timepiece movement (not shown) in this state, the pointer 1 moves according to the rotation of the pointer shaft 5 to indicate time.

Figure 3:
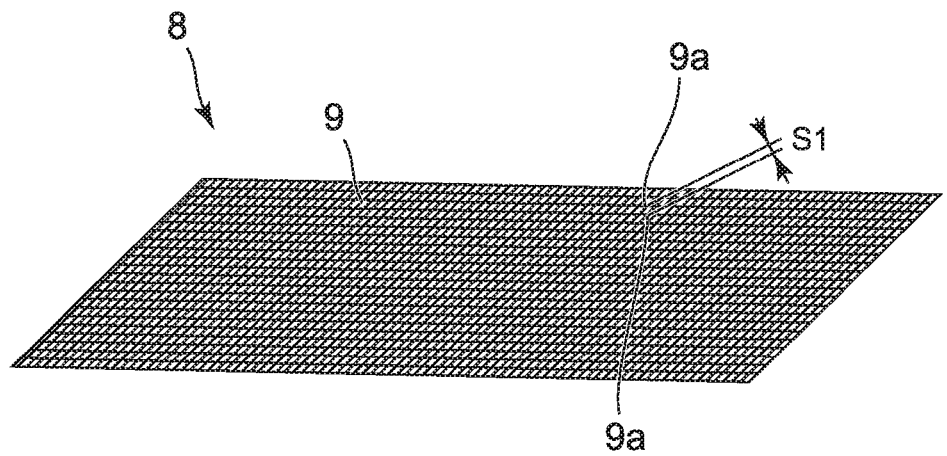
FIG. 3 is an enlarged perspective view of the main portion, in which a material sheet of the pointer body depicted in FIG. 1 is shown.
Figure 4:
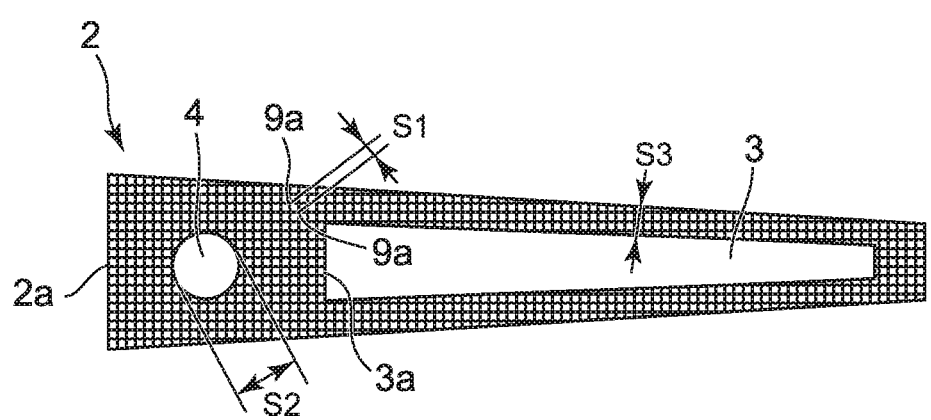
FIG. 4 is an enlarged front view depicting a state where the pointer body has been formed with the material sheet depicted in FIG. 3.

The pointer body 2 of the pointer 1 is formed of a material sheet 8, as depicted in FIG. 3 and FIG. 4. This material sheet 8 is a UD prepreg (Uni-Directional Prepreg) sheet acquired by synthetic resin being impregnated in a carbon fiber textile sheet 9 having carbon fibers woven thereinto. That is, the UD prepreg sheet is a carbon fiber reinforced plastic (CFRP: Carbon Fiber Reinforced Plastics) sheet.

In this case, as depicted in FIG. 3, the carbon fiber textile sheet 9 has carbon fiber warps and carbon fiber wefts combined and interwoven, and is a twill weave in which a texture crossing point 9a of a point where a warp and a weft cross is arranged obliquely, a plain weave in which a texture crossing point 9a of a point where a warp and a weft cross is arranged vertically and horizontally, or a textile woven by other weaving methods. Examples of the carbon fibers are PAN (Polyacrylonitrile)-based carbon fibers using acrylic fibers or pitch (PITCH)-based carbon fibers using pitch.

The carbon fiber textile sheet 9 has an interval S1 between the texture crossing points 9a formed smaller than the length of the smaller one of the length of the narrowest portion in the pointer body 2 and the inner diameter S2 of the mount hole 4 provided in the pointer body 2, as depicted in FIG. 3 and FIG. 4. That is, the carbon fiber textile sheet 9 has the interval S1 between the texture crossing points 9a formed smaller than the length of the narrowest portion in the pointer body 2 and the inner diameter S2 of the mount hole 4 provided in the pointer body 2.

For example, when the length of the narrowest portion in the pointer body 2 is an interval S3 between the outer circumference of the pointer body 2 and the inner circumference of the long hole 3, and the interval S3 of the narrowest portion in the pointer body 2 is smaller than the inner diameter S2 of the mount hole 4 (S3<S2), the interval S1 between the texture crossing points 9a of the carbon fiber textile sheet 9 is smaller than interval S3 of the narrowest part of pointer body 2 (S1<S3<S2). Also, in a case where the interval S3 of the narrowest portion in the pointer body 2 is larger than the inner diameter S2 of the mount hole 4 (S3>S2), the interval S1 between the texture crossing points 9a of the carbon fiber textile sheet 9 is smaller than the inner diameter S2 of the mount hole 4 (S1<S2<S3).

The pointer body 2 formed of this material sheet 8 has its entire surface coated with a coating film 10, as depicted in FIG. 2. This coating film 10 is a film made of synthetic resin, and is structured to cover the entire surface including the front surface, the back surface, and each outer side surface of the pointer body 2, and each inner circumference surface of the mount hole 4 and the long hole 3, and protect the entire surface of the material sheet 8 forming the pointer body 2.

Next, a method of manufacturing the pointer body 2 of the pointer 1 is described. First, in the manufacture of the material sheet 8, carbon fiber warps and wefts are combined and interwoven, whereby the carbon fiber textile sheet 9 is formed. Then, the material sheet 8 is formed as the UD prepreg sheet by the carbon fiber textile sheet 9 being impregnated with synthetic resin.

In this embodiment, the carbon fiber textile sheet 9 of the material sheet 8 is formed by any of the twill weave in which the texture crossing point 9a of a point where the warp and the weft cross is arranged obliquely, the plain weave in which the texture crossing point 9a of a point where the warp and the weft cross is arranged in a grid shape vertically and horizontally, or a textile woven by other weaving methods, as depicted in FIG. 3.

Also, the carbon fiber textile sheet 9 has the interval S1 between the texture crossing points 9a formed smaller than the length of the smaller one of the length (interval S3) of the narrowest portion in the pointer body 2 and the inner diameter S2 of the mount hole 4 provided in the pointer body 2, as depicted in FIG. 3.

For example, in a case where the interval S3 of the narrowest portion in the pointer body 2 is smaller than the inner diameter S2 of the mount hole 4 (S3<S2), the interval S1 between the texture crossing points 9a of the carbon fiber textile sheet 9 is formed smaller than the interval S3 of the narrowest portion in the pointer body 2 (S1<S3<S2). Also, in a case where the interval S3 of the narrowest portion in the pointer body 2 is larger than the inner diameter S2 of the mount hole 4 (S3>S2), the interval S1 between the texture crossing points 9a of the carbon fiber textile sheet 9 is formed smaller than the inner diameter S2 of the mount hole 4.

Then, the material sheet 8 is cut with a laser beam to form the pointer body 2, as depicted in FIG. 4. Here, first, a portion corresponding to the long hole 3 of the pointer body 2 and a portion corresponding to the mount hole 4 of the pointer body 2 are cut with a laser beam and, in this state the pointer body 2 is cut in accordance with the contour thereof with a laser beam.

Thereafter, the coating film 10 is formed on the entire surface of the cut pointer body 2. Here, the pointer body 2 is immersed in a coating fluid all at once, whereby the entire surface of the pointer body 2 is coated with the coating fluid. When the coated coating fluid is dried, the coating film 10 is formed on the entire surface of the pointer bodies 2.

The pointer body 2 formed as described above has the carbon fiber textile sheet 9 of the material sheet 8 formed by carbon fiber warps and carbon fiber wefts being combined and interwoven, whereby the rigidity and elasticity of the pointer body 2 in multiple directions which are all of the directions including the longitudinal direction of the pointer body 2, the direction orthogonal to this direction, and the direction intersecting with each of these directions are enhanced, as depicted in FIG. 3 and FIG. 4.

That is, the flexural durability of the pointer body 2 in the longitudinal direction is high, so that flexure deformation in the longitudinal direction of the pointer body 2 is suppressed. In addition, the durability of the pointer body 2 against deformation such as curving and twisting of the pointer body 2 is also high, so that deformation such as curving and twisting of the pointer body 2 is suppressed. Accordingly, the durability of the pointer body 2 against various types of deformations such as the curving, bending, or twisting is high, and impact resistance is also high.

Next, a case is described in which the mount piece 6 is mounted on the pointer body 2, and the pointer body 2 is mounted on the pointer shaft 5 with this mount piece 6. Here, the cylindrical section 6a of the mount piece 6 is inserted from above into the mount hole 4 of the pointer body 2, the presser section 6b is made to abut on the upper surface of the pointer body 2, and the swaged section 6c is made to project to the lower side of the pointer body 2, as depicted in FIG. 2. In this state, the washer section 7 is attached from below to the lower portion of the cylindrical section 6a projecting downward, and the swaging processing of the swaged section 6c is performed.

As a result, the washer section 7 is pressed onto the lower surface of the pointer body 2 by the swaged section 6c subjected to the swaging processing, as depicted in FIG. 2. Accordingly, by the swaged section 6c pressing the washer section 7 against the lower surface of the pointer body 2, the pointer body 2 is pinched between the washer section 7 and the presser section 6b in the thickness direction, as depicted in FIG. 2. As a result the mount piece 6 is mounted on the pointer body 2 to structure the pointer 1.

Then, in the mounting of the pointer body 2 onto the pointer shaft 5, when the cylindrical section 6a of the mount piece 6 of the pointer 1 is fitted in the upper end of the pointer shaft 5, the pointer body 2 is mounted on the upper end of the pointer shaft 5 with the mount piece 6, as depicted in FIG. 2. In this state, when the pointer shaft 5 is rotated by a timepiece movement (not depicted), the pointer 1 moves along the rotation of the pointer shaft 5 to indicate time.

As such, the pointer body 2 of this pointer 1 is formed with the material sheet 8 of the carbon fiber textile sheet 9 having the carbon fiber woven thereinto, whereby the rigidity of the pointer body 2 can be secured. Moreover, the layer thickness of the material sheet 8 can be made thin, whereby the weight of the pointer body 2 can be further reduced, and the thickness of the pointer body 2 can be made thin. Accordingly, restrictions regarding the size and shape of the pointer body 2 are reduced, whereby the pointer body 2 can be formed largely in a free shape, and the enhancement of the design can be achieved.

That is, in the pointer 1, the carbon fiber textile sheet 9 of the material sheet 8 has a structure achieved by carbon fiber warps and carbon fiber wefts being combined and interwoven, whereby the rigidity and elasticity of the pointer body 2 in all of the directions including the longitudinal direction of the pointer body 2, the direction orthogonal to this direction, and the direction intersecting with each of these directions can be enhanced.

Accordingly, the flexural durability of the pointer body 2 in the longitudinal direction is high, so that flexure deformation in the longitudinal direction of the pointer body 2 is suppressed. In addition, the durability of the pointer body 2 against deformation such as curving and twisting of the pointer body 2 is high, so that deformation such as curving and twisting of the pointer body 2 is unfailingly suppressed. As a result, the pointer body 2 has high durability against various types of deformations such as curving, bending or twisting, and has high impact resistance.

In this embodiment the carbon fiber textile sheet 9 is formed by any one of the twill weave in which the texture crossing point 9a of a point where the warp and the weft cross is arranged obliquely, the plain weave in which the texture crossing point 9a of a point where the warp and the weft cross is arranged in the grid shape vertically and horizontally, and a textile woven by other weaving methods, and has the interval S1 between the texture crossing points 9a formed smaller than the length of the smaller one of the length (interval S3) of the narrowest portion in the pointer body 2 and the inner diameter S2 of the mount hole 4 provided in the pointer body 2. Accordingly, even if the layer thickness of the material sheet 8 is made thin, the rigidity of the pointer body 2 can be secured sufficiently, and the weight of the pointer body 2 can be further reduced.

Second Embodiment

Figure 5:
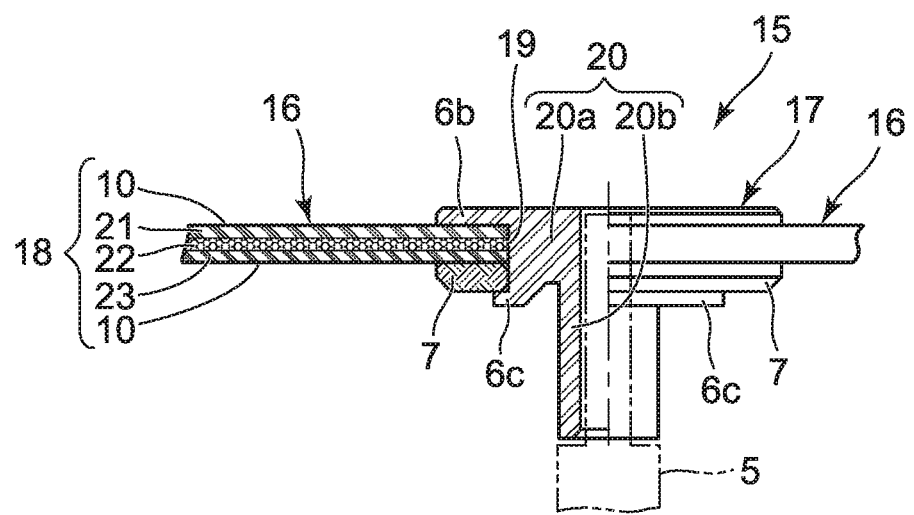
FIG. 5 is an enlarged half-sectional view of the main portion of a second embodiment in which the present invention has been applied in a pointer of a wristwatch.
Figure 6:
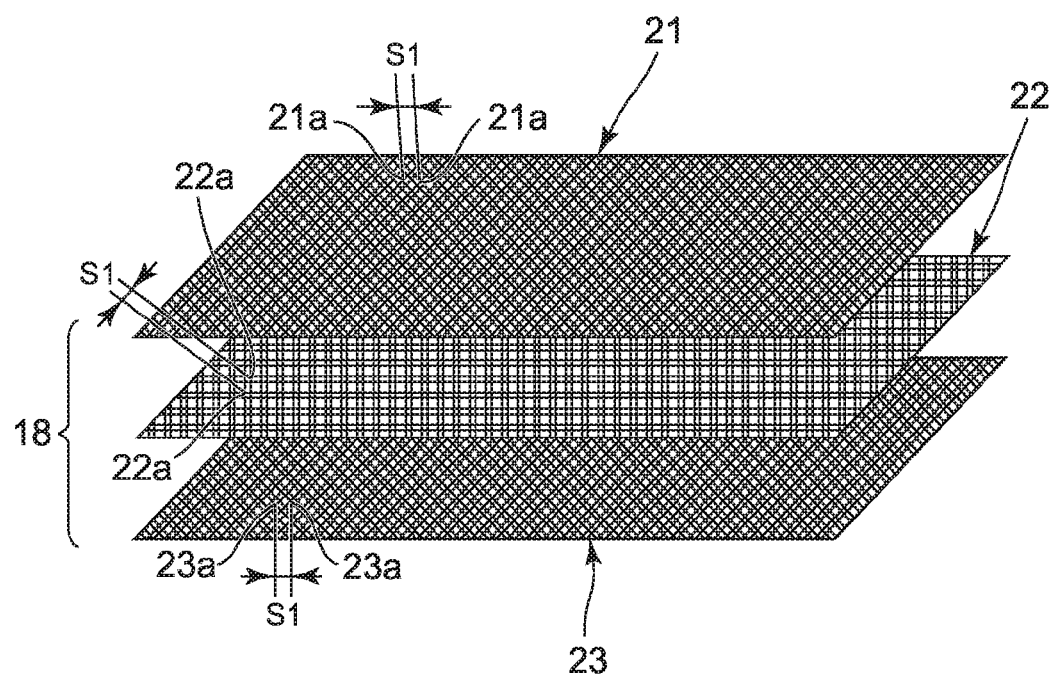
FIG. 6 is an enlarged perspective view of the main portion, in which a material sheet of the pointer body of FIG. 5 is shown with it being disassembled.

Next, a second embodiment in which the present invention has been applied in a pointer of a wristwatch is described with reference to FIG. 5 and FIG. 6. Note that sections that are identical to those of the first embodiment depicted in FIG. 1 to FIG. 4 are given the same reference numerals for description. This pointer 15 is structured to have a mount piece 17 and a material sheet 18 of a pointer body 16 which are different from the first embodiment, as depicted in FIG. 5 and FIG. 6. Except for this point, the second embodiment is identical in structure to the first embodiment.

In this embodiment, the pointer body 16 is formed in an elongated shape whose width is wide at one end and gradually becomes narrower toward the other end, as with the first embodiment. This pointer body 16 is also provided with a long hole (not depicted) and a mount hole 19. The mount piece 17 referred to as "hakama" for mounting the pointer body 16 on the pointer shaft 5 has a cylindrical section 20 which has a structure different from that of the first embodiment and is inserted into the mount hole 19 of the pointer body 16 to be fitted in the pointer shaft 5, as depicted in FIG. 5. Except for this point, the structure of the mount piece 17 is same as that of the first embodiment.

That is, the mount piece 17 includes the cylindrical section 20, the presser section 6b which is provided on the upper end of the cylindrical section 20 so as to press the upper surface of the pointer body 16, the washer section 7 which is inserted into the lower end of the cylindrical section 20 so as to be placed on the lower surface of the pointer body 16, and the swaged section 6c which is provided on the lower outer circumference of the cylindrical section 20 so as to press the washer section 7 against the lower surface of the pointer body 16, as depicted in FIG. 5.

In this embodiment, the cylindrical section 20 includes a large diameter cylindrical section 20a and a small diameter cylindrical section 20b, as depicted in FIG. 5. The outer diameter of the large diameter cylindrical section 20a is formed having the same size as that of the inner diameter of the mount hole 19 of the pointer body 16, and the height of the large diameter cylindrical section 20a in the vertical direction is formed to be substantially the same as that of the first embodiment. The outer diameter of the small diameter cylindrical section 20b is formed smaller than the inner diameter of the swaged section 6c, and the height of the small diameter cylindrical section 20b in the vertical direction is formed to be substantially the same as that of the large diameter cylindrical section 20a. The small diameter cylindrical section 20b is provided projecting to the lower side of the large diameter cylindrical section 20a.

As a result, the pointer 15 is structured as depicted in FIG. 5 such that, in a state where the large diameter cylindrical section 20a of the cylindrical section 20 of the mount piece 17 has been inserted into the mount hole 19 of the pointer body 16 to cause the presser section 6b to come in contact with the upper surface of the pointer body 16, when swaging processing for the swaged section 6c is performed to cause the washer section 7 to push up the lower surface of the pointer body 16, the pointer body 16 is pinched between the washer section 7 and the presser section 6b in the thickness direction to mount the large diameter cylindrical section 20a of the cylindrical section 20 of the mount piece 17 on the pointer body 16.

Also, the pointer 15 is structured such that, when the mount piece 17 is mounted on the pointer body 16, the small diameter cylindrical section 20b of the cylindrical section 20 of the mount piece 17 projects to the lower side of the pointer body 16, and the upper end of the pointer shaft 5 is inserted from the lower side into the projecting small diameter cylindrical section 20b, and fitted in the cylindrical section 20 of the mount piece 17, as depicted in FIG. 5. As a result, the pointer 15 is structured such that the pointer body 16 is mounted on the upper end of the pointer shaft 5 and, when the pointer shaft 5 is rotated by a timepiece movement (not depicted) in this state, the pointer 15 is moved along with the rotation of the pointer shaft 5 to indicate time.

On the other hand, the material sheet 18 which constitutes the pointer body 16 of the pointer 15 is structured to have a plurality of laminated carbon fiber textile sheets 21 to 23, as depicted in FIG. 5 and FIG. 6. Each of the first to third carbon fiber textile sheets 21 to 23 is a UD prepreg sheet (carbon fiber reinforced synthetic resin sheet) acquired by carbon fibers being interwoven and synthetic resin being impregnated, as with the first embodiment.

In this embodiment, as depicted in FIG. 6, each of the first to third carbon fiber textile sheets 21 to 23 has carbon fiber warps and carbon fiber wefts combined and interwoven, and is a twill weave in which each of texture crossing points 21a to 23a of a point where a warp and a weft cross is arranged obliquely, a plain weave in which each of texture crossing points 21a to 23a of a point where a warp and a weft cross is arranged vertically and horizontally, or a textile woven by other weaving methods, as with the first embodiment.

Each of the first to third carbon fiber textile sheets 21 to 23 has an interval S1 between the texture crossing points 21a to 23a formed smaller than the length of the smaller one of the narrowest portion in the pointer body 16 and the inner diameter S2 of the mount hole 19 provided in the pointer body 16, as with the first embodiment.

In this case as well, for example, when the length of the narrowest portion of the pointer body 16 corresponds to an interval between the outer circumference of the pointer body 16 and the inner circumference of the long hole (not depicted), and the interval of the narrowest portion in the pointer body 16 is smaller than the inner diameter S2 of the mount hole 19, each interval S1 between the texture crossing points 21a to 23a is smaller than the interval of the narrowest portion of the pointer body 16. Also, in a case where the interval of the narrowest portion in the pointer body 16 is larger than the inner diameter S2 of the mount hole 19, each interval S1 between the texture crossing points 21a to 23a is smaller than the inner diameter S2 of the mount hole 19 (S1<S2).

In addition, the material sheet 18 is structured to have a three-layer structure where the first to third carbon fiber textile sheets 21 to 23 have been laminated with each arrangement direction of the texture crossing points 21a to 23a of the first to third carbon fiber textile sheets 21 to 23 being varied using the twill weave, the plain weave, or a textile woven by other weaving methods, as depicted in FIG. 6.

That is, the carbon fiber textile sheet 21 of the first layer and the carbon fiber textile sheet 22 of the second layer are arranged with the arrangement direction of the texture crossing point 21a of the carbon fiber textile sheet 21 of the first layer and the arrangement direction of the texture crossing point 22a of the carbon fiber textile sheet 22 of the second layer being crossed at an angle of substantially 45 degrees, as depicted in FIG. 6. Also, the carbon fiber textile sheet 21 of the first layer and the carbon fiber textile sheet 23 of the third layer are arranged with each arrangement direction of the texture crossing points 21a and 23a being in the same direction.

As a result, the material sheet 18 is formed such that, when the first to third carbon fiber textile sheets 21 to 23 are divided into two at the second layer in the laminating direction, the arrangement state of each carbon fiber on the upper layer portion side (the first and second carbon fiber textile sheets 21 and 22) and the arrangement state of each carbon fiber on the lower layer portion side (the second and third carbon fiber textile sheets 22 and 23) are identical to each other, as depicted in FIG. 6.

Also, the material sheet 18 is structured to be vertically bonded by thermocompression bonding with the first to third carbon fiber textile sheets 21 to 23 being laminated, as depicted in FIG. 5. In addition, as with the first embodiment, the pointer body 16 formed with this material sheet 18 has its entire surface coated with the coating film 10.

In the manufacture of the pointer body 16 using this material sheet 18, first, the material sheet 18 is formed by laminating the first to third carbon fiber textile sheets 21 to 23 with each arrangement direction of the texture crossing points 21a to 23a of the first to third carbon fiber textile sheets 21 to 23 being varied. Then, the material sheet 18 is cut with a laser beam to form the pointer body 16 as with the first embodiment. Thereafter, the coating film 10 is formed on the entire surface of the cut pointer body 16, as with the first embodiment.

In the pointer body 16 formed with this material sheet 18, the material sheet 18 has the three-layer structure where the first to third carbon fiber textile sheets 21 to 23 have been laminated with each arrangement direction of the texture crossing points 21a to 23a of the first to third carbon fiber textile sheets 21 to 23 being varied as depicted in FIG. 6. Therefore, the rigidity and elasticity of the pointer body 16 in all of the directions including the longitudinal direction of the pointer body 16, the direction orthogonal to this direction, and the direction intersecting with each of these directions can be more enhanced than the pointer body 2 of the first embodiment.

That is, each of the first to third carbon fiber textile sheets 21 to 23 is structured by carbon fiber warps and carbon fiber wefts being combined and interwoven, and the three-layer structure is achieved by these sheets being laminated. As a result, the pointer body 16 has the flexural durability stronger in the longitudinal direction than the pointer body 2 of the first embodiment, and flexure deformation in the longitudinal direction of the pointer body 2 is suppressed.

Accordingly, the durability of the pointer body 16 against deformation such as curving and twisting of the pointer body 16 is higher than the pointer body 2 of the first embodiment, so that deformation such as curving and twisting of the pointer body 2 is further suppressed. As a result, the durability of the pointer body 16 against various types of deformations such as curving, bending or twisting is higher than the pointer body 2 of the first embodiment, and the impact resistance is further enhanced.

As such, in this pointer 15, the material sheet 18 of the pointer body 16 has the three-layer structure where the first to third carbon fiber textile sheets 21 to 23 have been laminated with each arrangement direction of texture crossing points 21a to 23a of the first to third carbon fiber textile sheets 21 to 23 being varied, and therefore the rigidity of the pointer body 16 can be more enhanced than the pointer body 2 of the first embodiment.

In this case, the material sheet 18 has each of the first to third carbon fiber textile sheets 21 to 23 structured by carbon fiber warps and carbon fiber wefts being combined and interwoven, and has the first to third carbon fiber textile sheets 21 to 23 laminated with each arrangement direction of the texture crossing points 21a to 23a of the first to third carbon fiber textile sheets 21 to 23 being varied. Therefore, the rigidity and elasticity of the pointer body 16 in all of the directions including the longitudinal direction of the pointer body 16, the direction orthogonal to this direction, and the direction intersecting with each of these directions can be more enhanced than the pointer body 2 of the first embodiment.

Accordingly, the pointer body 16 has the flexural durability higher in the longitudinal direction than the pointer body 2 of the first embodiment, so that flexure deformation in the longitudinal direction of the pointer body 2 is more suppressed. Therefore, the durability of the pointer body 16 against deformation such as curving and twisting of the pointer body 16 is high, so that deformation such as curving and twisting of the pointer body 16 is further suppressed. As a result, the durability of the pointer body 16 against various types of deformations such as curving, bending or twisting of the pointer body 16 is higher than the pointer body 2 of the first embodiment, and the impact resistance is more enhanced.

In the second embodiment mentioned above, the material sheet 18 is structured by the first to third carbon fiber textile sheets 21 to 23 being laminated, with each arrangement direction of the texture crossing points 21a to 23a of the first to third carbon fiber textile sheets 21 to 23 being varied. However, the present invention is not limited thereto. For example, a structure may be adopted in which the first to third carbon fiber textile sheets 21 to 23 acquired using different weaving methods are laminated.

For example, a structure may be adopted in which the first carbon fiber textile sheet of the first layer and the third carbon fiber textile sheet of the third layer are made to be the same twill weave, the second carbon fiber textile sheet of the second layer is made to be the plain weave, and the first to third carbon fiber textile sheets are laminated in this state. Also, a structure may be adopted in which the first carbon fiber textile sheet of the first layer and the third carbon fiber textile sheet of the third layer are made to be the same plain weave, the second carbon fiber textile sheet of the second layer is made to be the twill weave, and the first to third carbon fiber textile sheets are laminated in this state.

In this case as well, when the first to third carbon fiber textile sheets are divided into two at the second layer in the laminating direction thereof, the arrangement state of each carbon fiber of each of the first and second carbon fiber textile sheets located on the upper layer portion side and the arrangement state of each carbon fiber of each of second and third carbon fiber textile sheets located on the lower layer portion side are formed to be in the same arrangement state.

In addition, in the descriptions of the above-described second embodiment and modification examples, the three-layer structure where the first to third carbon fiber textile sheets are laminated has been described. However, the present invention is not limited thereto. For example, a two-layer structure or a multilayer structure having four or more layers may be adopted. In the case of the multilayer structure, when a plurality of carbon fiber textile sheets are divided into two in the laminating direction thereof, the arrangement state of each carbon fiber of a plurality of carbon fiber textile sheets located on the upper layer portion side and the arrangement state of each carbon fiber of a plurality of carbon fiber textile sheets located on the lower layer portion side should preferred be the same arrangement state.

Also, in the above-described first and second embodiments and modification examples, the pointer bodies 2 and 16 are formed in an elongated plate shape. However, the present invention is not limited thereto. For example, a pointer body 25 may be formed in a shape such as that of a modification example depicted in FIG. 7. That is, in the pointer body 25 of this modification example, an airplane-shaped pointer section 25b is formed inside a circular shaped ring section 25a, and a mount hole 26 is provided in a portion of the pointer section 25b located at the center of the ring section 25a, whereby the whole pointer body is formed in a disc shape.

In this pointer body 25 of the disc shape as well, a material sheet has a single carbon fiber textile sheet acquired by carbon fiber warps and carbon fiber wefts being combined and interwoven, as with the first embodiment. The carbon fiber textile sheet has an interval between texture crossing points thereof formed smaller than the length of the smaller one of the length (interval S3) of the narrowest portion of the pointer body 25 and the inner diameter S2 of the mount hole 26 provided in the pointer body 25.

Figure 7:
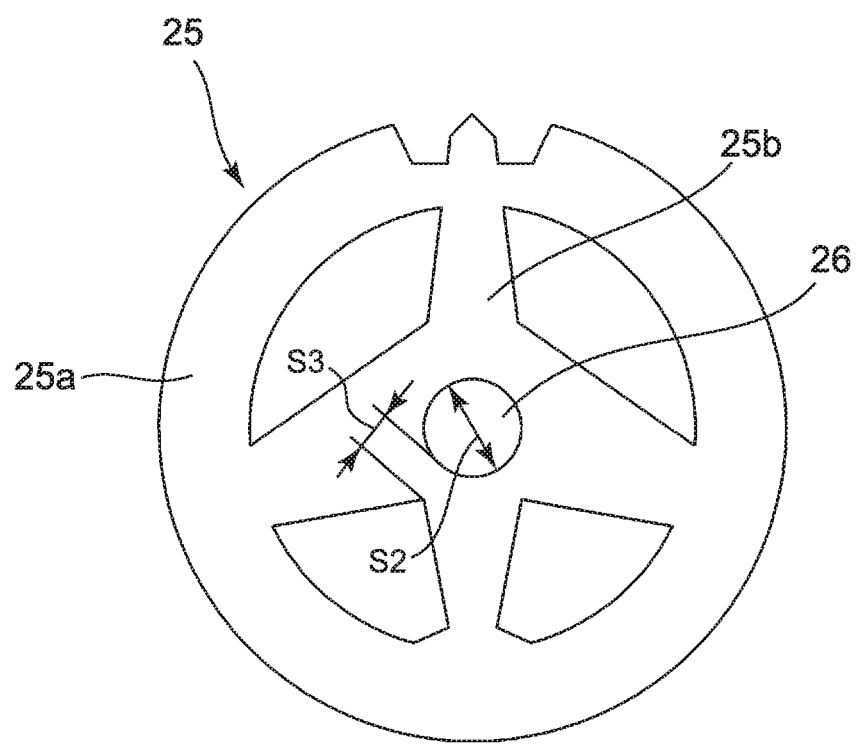
FIG. 7 is an enlarged front view depicting a modification example of the pointer body when the present invention is applied in the pointer of the wristwatch.

For example, as depicted in FIG. 7, the narrowest portion of the pointer body 25 is a portion where the pointer section 25b and the mount hole 26 are closest to each other, and the interval S3 of the portion where the pointer section 25b and the mount hole 26 are closest to each other is formed smaller than the inner diameter S2 of the mount hole 26. In the case, the interval between texture crossing points of the carbon fiber textile sheet is formed smaller than the interval S3 of the portion where the pointer section 25b and the mount hole 26 are closest to each other. Also, when the interval S3 of the portion where the pointer section 25b and the mount hole 26 are closest to each other is formed larger than the inner diameter S2 of the mount hole 26, the interval between texture crossing points of the carbon fiber textile sheet is formed smaller than the inner diameter S2 of the mount hole 26.

Also, in the pointer body 25 of the disc shape as well, the material sheet may have the three-layer structure where the first to third carbon fiber textile sheets have been laminated with each arrangement direction of the texture crossing points of the first to third carbon fiber textile sheets being varied, as with the second embodiment. Also, the material sheet may have the three-layer structure where the first to third carbon fiber textile sheets 21 to 23 acquired using different weaving methods have been laminated.

Moreover, in each of the above-mentioned first to third embodiments, the present invention has been applied to the pointers 1, 15 and 25 of the wristwatch. However, it is not necessarily required to be applied to a pointer of a wristwatch and may be applied to, for example, pointers of various kinds of timepieces such as a travel watch, an alarm clock, a table clock and a wall clock. In addition, it is not necessarily required to be applied to a pointer of a wristwatch and may be applied to a pointer of a measuring instrument such as a meter.

While the present invention has been described with reference to the preferred embodiments, it is intended that the invention be not limited by any of the details of the description therein but includes all the embodiments which fall within the scope of the appended claims.

What is claimed is:

1. A pointer comprising:
 a pointer body having a plurality of carbon fiber textile sheets laminated therein, each of the carbon fiber textile sheets having a carbon fiber woven thereinto,
 wherein at least one of the carbon fiber textile sheets has a twill weave, and at least one of the carbon fiber textile sheets has a plain weave,
 wherein the carbon fiber textile sheets are arranged such that the twill weave and the plain weave are alternatively arranged in the lamination direction and have a symmetric arrangement in the laminating direction, and
 wherein, within each of the carbon fiber sheets, an interval between texture crossing points, at which carbon fiber warps and carbon fiber wefts cross each other, is smaller than a length of a smaller one of (i) a length of a narrowest portion of a plane of the pointer body and (ii) an inner diameter of a mount hole provided in the pointer body.

2. The pointer according to claim 1, wherein the plurality of carbon fiber textile sheets are laminated in three layers where a fiber arrangement state of a first layer carbon fiber textile sheet and a fiber arrangement state of a second layer carbon fiber textile sheet are different from each other, and the fiber arrangement state of the first layer carbon fiber textile sheet and a fiber arrangement state of a third layer carbon fiber textile sheet are the same.

3. A timepiece comprising:
 the pointer according to claim 2.

4. A timepiece comprising:
 the pointer according to claim 1.

* * * * *